United States Patent
Borchers

(10) Patent No.: US 10,701,865 B2
(45) Date of Patent: Jul. 7, 2020

(54) HAY BALE SPIKE AND METHOD OF SUPPORTING A HAY BALE

(71) Applicant: Sadie Borchers, Petersburg, KY (US)

(72) Inventor: Sadie Borchers, Petersburg, KY (US)

(*) Notice: Subject to any disclaimer, the term of this patent is extended or adjusted under 35 U.S.C. 154(b) by 0 days.

(21) Appl. No.: 16/055,555

(22) Filed: Aug. 6, 2018

(65) Prior Publication Data
US 2019/0053433 A1 Feb. 21, 2019

Related U.S. Application Data

(60) Provisional application No. 62/547,362, filed on Aug. 18, 2017.

(51) Int. Cl.
| | | |
|---|---|---|
| *A01D 87/12* | (2006.01) | |
| *A01D 87/00* | (2006.01) | |
| *E02F 3/96* | (2006.01) | |
| *B66F 9/12* | (2006.01) | |

(52) U.S. Cl.
CPC ....... *A01D 87/127* (2013.01); *A01D 87/0076* (2013.01); *B66F 9/12* (2013.01); *E02F 3/962* (2013.01); *A01D 87/0069* (2013.01)

(58) Field of Classification Search
CPC ..... A01D 87/127; A01D 87/0076; B66F 9/12; E02F 3/962
USPC ............... 414/24.5, 24.6, 111; 294/120, 127
See application file for complete search history.

(56) References Cited

U.S. PATENT DOCUMENTS

| | | | | |
|---|---|---|---|---|
| 4,306,825 A * | 12/1981 | Yilit | ..................... | A01D 87/127 414/24.5 |
| 4,911,491 A * | 3/1990 | Naaktgeboren | ...... | A01D 87/126 294/105 |
| 5,178,505 A * | 1/1993 | Smith | .................. | A01D 87/127 414/24.5 |
| 5,651,653 A * | 7/1997 | Bablo | .................. | A01D 87/127 414/24.5 |
| 6,840,730 B2 * | 1/2005 | Noualy | ................ | A01D 87/127 414/24.5 |
| 6,848,883 B2 * | 2/2005 | Atencio | ............. | A01D 87/0076 414/24.5 |
| 7,753,636 B2 * | 7/2010 | Hennig | ................ | A01D 87/127 294/61 |
| 2002/0106272 A1* | 8/2002 | Westendorf | ........ | A01D 87/0076 414/685 |
| 2005/0069405 A1* | 3/2005 | McGinnes | ........... | A01D 87/127 414/722 |
| 2009/0162168 A1* | 6/2009 | Fast | ..................... | A01B 59/043 414/24.5 |

(Continued)

*Primary Examiner* — Lynn E Schwenning
(74) *Attorney, Agent, or Firm* — Ulmer & Berne LLP

(57) ABSTRACT

Disclosed are hay bale spikes for tractors used to carry hay bales. A hay bale carrying system includes a frame attachable to a tractor. The frame includes a first spike rigidly connected and a second spike movably attached parallel to the first spike, where the second spike is movable to a position that is not parallel to the first spike. An opening in the frame may position a pin to matingly accept the second spike that includes a lever arm on the opposite side of the pin from the spike. The lever arm may include a connector near its end connectable to a hydraulic cylinder such that expansion and contraction of the hydraulic cylinder provides leverage through the pin to the second spike to move the second spike from a first parallel position relative to the first spike to a second non-parallel position.

10 Claims, 3 Drawing Sheets

(56) References Cited

U.S. PATENT DOCUMENTS

| | | | | |
|---|---|---|---|---|
| 2011/0002757 A1* | 1/2011 | Taylor | ............... | A01D 87/127 |
| | | | | 414/24.5 |
| 2012/0114450 A1* | 5/2012 | Hennig | ............ | A01D 87/127 |
| | | | | 414/24.5 |
| 2013/0028686 A1* | 1/2013 | Bowne | ............... | A01D 87/122 |
| | | | | 414/24.5 |
| 2014/0212244 A1* | 7/2014 | Meyer | ............... | A01D 87/127 |
| | | | | 414/24.5 |
| 2016/0316630 A1* | 11/2016 | Lee | ................. | A01D 87/122 |

\* cited by examiner

HAY BALE SPIKE AND METHOD OF SUPPORTING A HAY BALE

CROSS REFERENCE TO RELATED APPLICATIONS

This application claims the priority benefit of U.S. Provisional Patent Application No. 62/547,362 filed Aug. 18, 2017, which is hereby incorporated herein by reference.

TECHNICAL FIELD

Embodiments of the technology relate, in general, to tractor technology, and in particular to hay bale spikes and carrying attachments for tractors or other machines used to carry hay bales.

SUMMARY

In one embodiment, a hay bale carrying system includes a frame having mounting brackets that are positioned to attach the frame to a tractor. The frame includes a first spike rigidly connected to the frame, the first spike pointed away from the frame, the first spike having a length of at least 24 inches, and having a second spike movably attached to the frame, the second spike pointable away from the frame parallel to the first spike, the second spike movable to a position that is not parallel to the first spike. The hay bale carrier may have a second spike that is rotatable about a pin, the pin positioned in the frame pinning the frame to the second spike. The hay bale carrier may further include an opening in the frame with a pin positioned in the opening, wherein the second spike may include an opening that matingly accepts the pin, wherein the second spike includes a lever arm positioned on the opposite side of the pin from the spike.

The lever arm may include a connector near its end that is connectable to a hydraulic cylinder such that expansion and contraction of the hydraulic cylinder provides leverage through the pin to the second spike to move the second spike from a first parallel position relative to the first spike to a second non-parallel position relative to the first spike. In another embodiment the lever arm includes a connector near its end that is connectable to a ratchet such that moving the ratchet up and down provides leverage through the pin to the second spike to move the second spike from a first parallel position relative to the first spike to a second non-parallel position relative to the first spike, and maintains the second spike in a desired position relative to the first spike. The first spike may be at least 30 inches long and the second spike may be at least 20 inches long. The hay bale carrying system may further include a third spike rigidly attached to the frame, the third spike parallel to the first spike and having a length of at least 24 inches.

In a further embodiment, a hay bale carrying system includes a frame having a horizontal bar at least 30 inches wide rigidly connected to a vertical bar at least 30 inches tall, the horizontal bar having at least two mounting brackets positioned to attach the frame to a tractor, and the vertical bar having at least one mounting bracket positioned to attach the frame to a tractor. A first spike may be attached to the frame, the first spike pointed away from the frame, where the first spike has a length of at least 24 inches. A second spike may be attached to the frame, the second spike pointed away from the frame, the second spike having a length of at least 24 inches, wherein the first spike and the second spike are movable towards and away from each other.

In a particular embodiment, the first and second spikes are attached to the horizontal bar, and a third spike is attached to the vertical bar, the third spike having a length of at least 24 inches. In another embodiment, the first spike and the third spike are attached to the horizontal bar, and the second spike is attached to the vertical bar. The first and third spike may be rigidly attached to the horizontal bar and the second spike may be movably attached to the vertical bar. In another embodiment, the second spike is rotatable about a pin, the pin positioned in the vertical bar, pinning the frame to the second spike. For example, the frame may include an opening with a pin positioned in the opening, wherein the second spike includes a hole that matingly accepts the pin, wherein the second spike includes a lever arm positioned on the opposite side of the pin from the spike.

The hay bale carrier may have a lever arm that includes a connector near its end that is connectable to a hydraulic cylinder such that expansion and contraction of the hydraulic cylinder provides leverage through the pin to the second spike to move the second spike from a first parallel position relative to the first and third spikes to a second non-parallel position relative to the first and third spikes. In another embodiment the lever arm includes a connector near its end that is connectable to a ratchet such that moving the ratchet up and down provides leverage through the pin to the second spike to move the second spike from a first parallel position relative to the first and third spikes to a second non-parallel position relative to the first and third spikes, and maintains the second spike in a desired position relative to the first and third spikes.

In one embodiment, a frame having a horizontal bar at least 30 inches wide rigidly is connected to a vertical bar at least 30 inches tall, where the horizontal bar has at least two mounting brackets positioned to attach the frame to a tractor, and the vertical bar has at least one mounting bracket positioned to attach the frame to a tractor. A first spike may be rigidly attached to the horizontal bar, the first spike pointed away from the frame, the first spike having a length of at least 24 inches, and a second spike may be rigidly attached to the horizontal bar, the second spike pointed away from the frame, the second spike having a length of at least 24 inches. A third spike may be attached to the vertical bar and pointed away from the frame, the third spike having a first rigid portion and a second movable portion, wherein the first rigid portion is rigidly connected to the vertical bar and the second movable portion is movably attached to the vertical bar such that the second movable portion is movable towards and away from the first rigid portion.

In a particular embodiment the second movable portion may be rotatable about a pin, the pin positioned in the vertical bar pinning the frame to the second movable portion. The vertical bar may include an opening with a pin positioned in the opening, wherein the second movable portion includes an opening that matingly accepts the pin, wherein the second movable portion includes a lever arm positioned on the opposite side of the pin from the third spike. The lever arm may include a connector near its end that is connectable to a hydraulic cylinder such that expansion and contraction of the hydraulic cylinder provides leverage through the pin to the second movable portion to move the second movable portion from a first parallel position relative to the first rigid portion to a second non-parallel position relative to the first rigid portion.

In another embodiment the lever arm includes a connector near its end that is connectable to a ratchet such that moving the ratchet up and down provides leverage through the pin to the second movable portion to move the second movable portion from a first parallel position relative to the first rigid portion to a second non-parallel position relative to the first rigid portion, and maintains the second movable portion in a desired position relative to the first rigid portion.

In a particular embodiment a method of supporting a hay bale is described, the method including the steps of providing a frame having a horizontal bar at least 30 inches wide that is rigidly connected to a vertical bar at least 30 inches tall, where the horizontal bar has at least two mounting brackets positioned to attach the frame to a tractor, and the vertical bar has at least one mounting bracket positioned to attach the frame to a tractor. A first spike may be rigidly attached to the horizontal bar, the first spike pointed away from the frame, the first spike having a length of at least 24 inches, and a second spike may be rigidly attached to the horizontal bar, the second spike pointed away from the frame, the second spike having a length of at least 24 inches. A third spike may be attached to the vertical bar and pointed away from the frame, the third spike having a first rigid portion and a second movable portion, wherein the first rigid portion is rigidly connected to the vertical bar and the second movable portion is movably attached to the vertical bar such that the second movable portion is movable towards and away from the first rigid portion. The method then includes the steps of connecting the frame to a tractor; spiking a hay bale with the frame using the tractor; moving the second movable portion of the third spike from a first position to a second position, the second position securing the hay bale to the tractor; moving the hay bale; moving the second movable portion of the third spike from the second position back to the first position; and releasing the hay bale from the frame. The method may include the step of rotating the movable portion about a pin, the pin positioned in the vertical bar pinning the frame to the second movable portion.

BRIEF DESCRIPTION OF THE DRAWINGS

The present disclosure will be more readily understood from a detailed description of some example embodiments taken in conjunction with the following figures.

DETAILED DESCRIPTION

Figure 1:
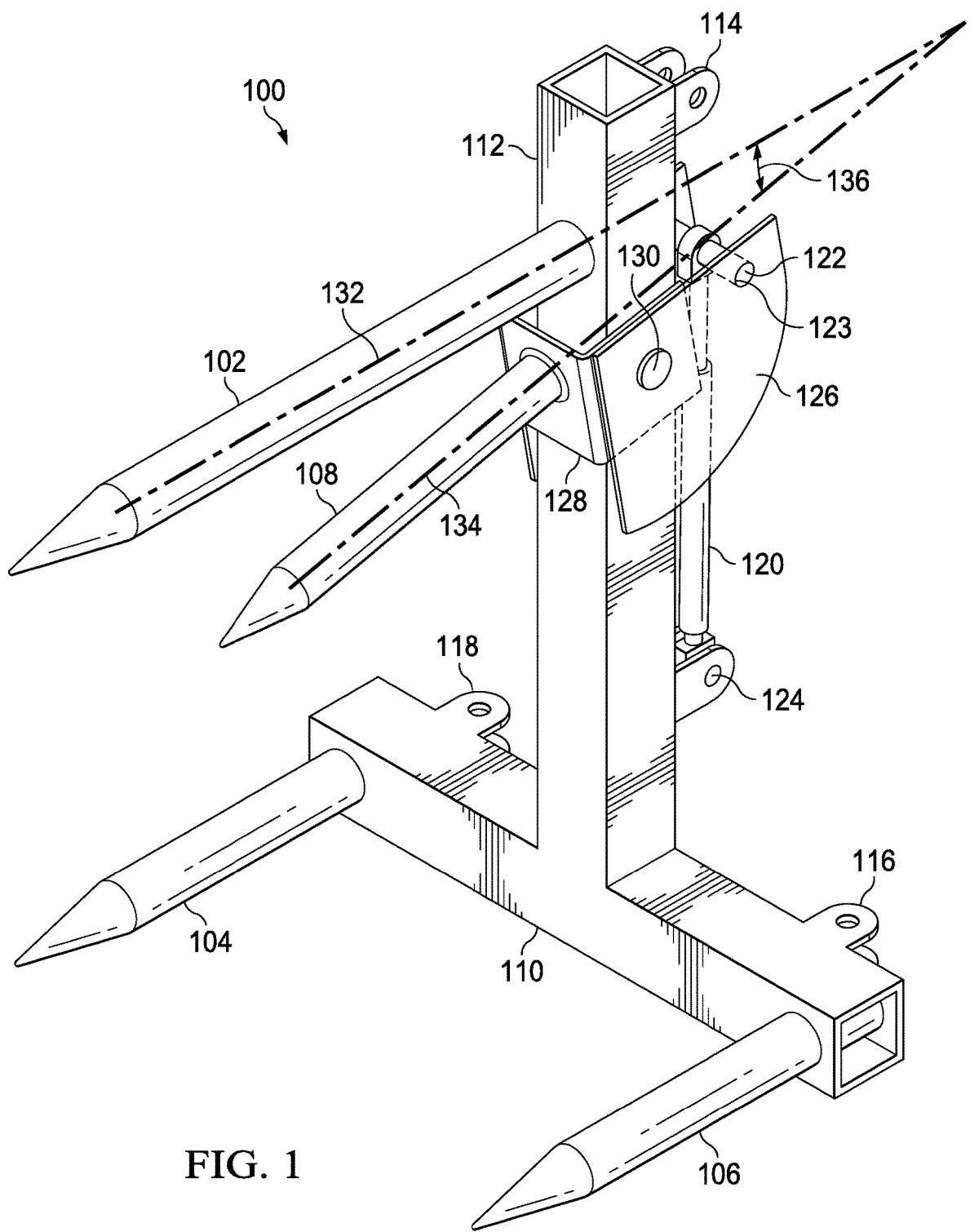
FIG. 1 is an embodiment of hay bale spike.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for carrying hay bales. In one example embodiment, a hay bale spike is configured to mount to a tractor. In some embodiments, the hay bale spike includes a hydraulic cylinder controllable from the tractor to move at least one carrying arm. In some embodiments, a linkage is used to move a carrying arm from a first position for loading the hay bale to a second position for moving the hay bale.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can support a hay bale on a tractor such that the hay bale will not fall off or become dislodged when the tractor is moving. For example, a tractor may be moved into contact with a hay bale and impale the bale with a main carrying arm and a movable support arm with the movable support arm in a first position for loading the hay bale. The movable support arm may then be moved into a second position that holds the hay bale in place so that the hay bale can be easily moved without the hay bale becoming dislodged from the spike during transport. For example, a movable spear may be added to an existing three pronged spear hay bale carrier. The functionality of the moving spear will allow maximum control for farmers when moving, feeding, or storing hay. A hydraulic ram on the back of the movable arm may be used to force the movable arm downward, thereby expanding within a bale, and preventing the bale from falling off until released. Likewise, the hay bale may be impaled by the movable spear with the spear in a downward position, and then the movable spear may be moved upward to compress hay between the movable spear and a non-movable spear, thereby holding the hay and preventing the bale from falling off until released.

Reference to the term "tractor" is not intended to be limiting, but instead intended to be a generic term for any vehicle capable of carrying a hay bale. For example, embodiments of the present invention are suitable for use on front loaders, Bobcats, Skidsteer equipment or other equipment or machines, as well as on the rear hitch of a tractor, which would all fall under the generic term "tractor" definition as used herein.

Referring now to FIG. 1, a hay bale spike 100 is illustrated having a main carrying arm 102 for carrying a hay bale such as, for example, a large round circular cylinder hay bale. The main carrying arm 102 may be impaled into the central area of the hay bale in a spearing fashion. Optional first support arm 104 and second support arm 106 may also be impaled at the same time as the main carrying arm 102, thereby adding additional vertical and rotational support to the hay bale spike 100. The main carrying arm 102 has a main carrying arm central axis 132. In accordance with one embodiment of the present invention, a movable support arm 108 having a movable support arm central axis 134 works in cooperation with the main carrying arm 102 to hold the hay bale in place during transport.

The hay bale spike 100 may include a horizontal brace 110 and a vertical brace 112 that hold the main carrying arm 102, first support arm 104 and second support arm 106 in a substantially triangular relationship and provide mechanical structure to attach the hay bale spike 100 to a tractor. For example, a first mounting bracket 114, second mounting bracket 116 and third mounting bracket 118 may be provided to attach the hay bale spike 100 to a hydraulic lifting arm of a tractor. When the hay bale is impaled, the tractor may then raise and lower the hay bale so that it can be moved.

The movable support arm 108 is rigidly attached to a movable arm support bracket 128 that rotates on a movable arm pivot 130, illustrated in FIG. 1 as extending through the vertical brace 112. The movable arm pivot 130 allows the movable arm support bracket 128 to rotate up and down, thereby moving the movable support arm 108 towards and away from the main carrying arm 102. The movable arm support bracket 128 includes a pivot pin opening 123 that holds a top hydraulic mount pivot pin 122. The pivot pin opening 123 is on the opposite side of the vertical brace 112 from the movable support arm 108, providing leverage for the rotation of the movable arm support bracket 128 that moves the movable support arm 108 to change a axis angle 136 between the main carrying arm central axis 132 and the movable support arm central axis 134. A range of motion of about 30 degrees of the movable support arm central axis 134 below the main carrying arm central axis 132 to about 30 degrees of the movable support arm central axis 134 above the main carrying arm central axis 132 is a reasonable range of motion to hold a hay bale and release it from the hay bale spike 100. The range of motion may be up to about 45 degrees between the movable support arm central axis 134 and the main carrying arm central axis 132.

If the movable support arm central axis 134 is angled 30 degrees below the main carrying arm central axis 132 as shown in the configuration illustrated in FIG. 1, then the movable support arm 108 is pointed down and away from the main carrying arm 102. If the movable support arm central axis 134 were angled 30 degrees above the main carrying arm central axis 132, then the movable support arm 108 would be pointed up and towards the main carrying arm 102. The movable arm pivot plate 126 may have a range of motion such that when the axis angle 136 is at the maximum up angle, the tip of the movable support arm 108 may about touch the main carrying arm 102. In this configuration, with the movable support arm 108 about touching the main carrying arm 102, when the hay bale spike 100 is impaled into a hay bale, the main carrying arm 102 and the movable support arm 108 effectively travel in the same path. As the movable support arm 108 is then moved away from the main carrying arm 102 the movable support arm 108 opens such that the movable support arm 108 will apply a force in the hay bale effectively holding the hay bale onto the hay bale spike 100.

In an opposite configuration to the one described above, with the movable support arm 108 at its furthest from the main carrying arm 102, when the hay bale spike 100 is impaled into a hay bale, the main carrying arm 102 and the movable support arm 108 will travel in separate paths, thereby having a portion of the hay between the main carrying arm 102 and the movable support arm 108. As the movable support arm 108 is then moved towards the main carrying arm 102, the movable support arm 108 closes such that the movable support arm 108 will apply a force in the hay trapped between the main carrying arm 102 and the movable support arm 108, again effectively holding the hay bale onto the hay bale spike 100.

As illustrated in FIG. 1, the vertical brace 112 includes a bottom hydraulic mount pivot pin 124 to which a hydraulic cylinder 120 or other mechanism can be attached. For example, the hydraulic cylinder 120 may be used along with the hydraulic system of a tractor to provide opening and closing force to the movable arm support bracket 128. The hydraulic cylinder 120 can be mounted via the bottom hydraulic mount pivot pin 124 and the top hydraulic mount pivot pin 122 so that as the hydraulic cylinder 120 expands and contracts, the hydraulic cylinder 120 pushes up at the back of the movable arm support bracket 128 or pulls down at the back of the movable arm support bracket 128 thereby moving the movable support arm 108 down and up respectively. The hydraulic cylinder 120 may be replaced with a linkage to manually move the movable support arm 108, with a hand activated hydraulic cylinder, a jack mechanism or other mechanism that can provide the mechanical advantage to move the movable support arm 108 relative to the main carrying arm 102.

In one embodiment the horizontal brace 110 may be about 28 inches wide, the vertical brace 112 may be about 25 inches high, and the main carrying arm 102 may be about 48 inches long. The first support arm 104, second support arm 106 and movable support arm 108 may be about 20 inches long, and the first support arm 104 and second support arm 106 may be separated about 24 inches. The main carrying arm 102 may be about 19 inches above the horizontal brace 110. The horizontal brace 110 and the vertical brace 112 may be fabricated from, for example, 2.75 inch square mild steel tubing. The hay bale spike 100 may be made from mild steel, Aluminum, stainless steel or other material strong enough to support the loads associated with hay bales. The hay bale spike 100 may also be coated, such as by powder coating, paint or other corrosion resistant material.

The main carrying arm 102, first support arm 104, second support arm 106 and movable support arm 108 may be fabricated from round tubing, which may be straight or may be tapered such that the tip is smaller than the base of the tube that is attached to the horizontal brace 110 or vertical brace 112. The movable support arm 108 may be about 18 inches long and may include a pointed tip to ease the insertion of the movable support arm 108 into the hay bale. The first support arm 104 and second support arm 106 may be about 20 inches long and may be welded into or otherwise held in the horizontal brace 110 such that about 18 inches extends from the horizontal brace 110. The movable arm pivot 130 may be about 1.3 inches diameter, and the top hydraulic mount pivot pin 122 may be about 0.5 inches diameter. The spacing between the movable arm pivot 130 and the top hydraulic mount pivot pin 122 may be about 8 inches.

Figure 2:
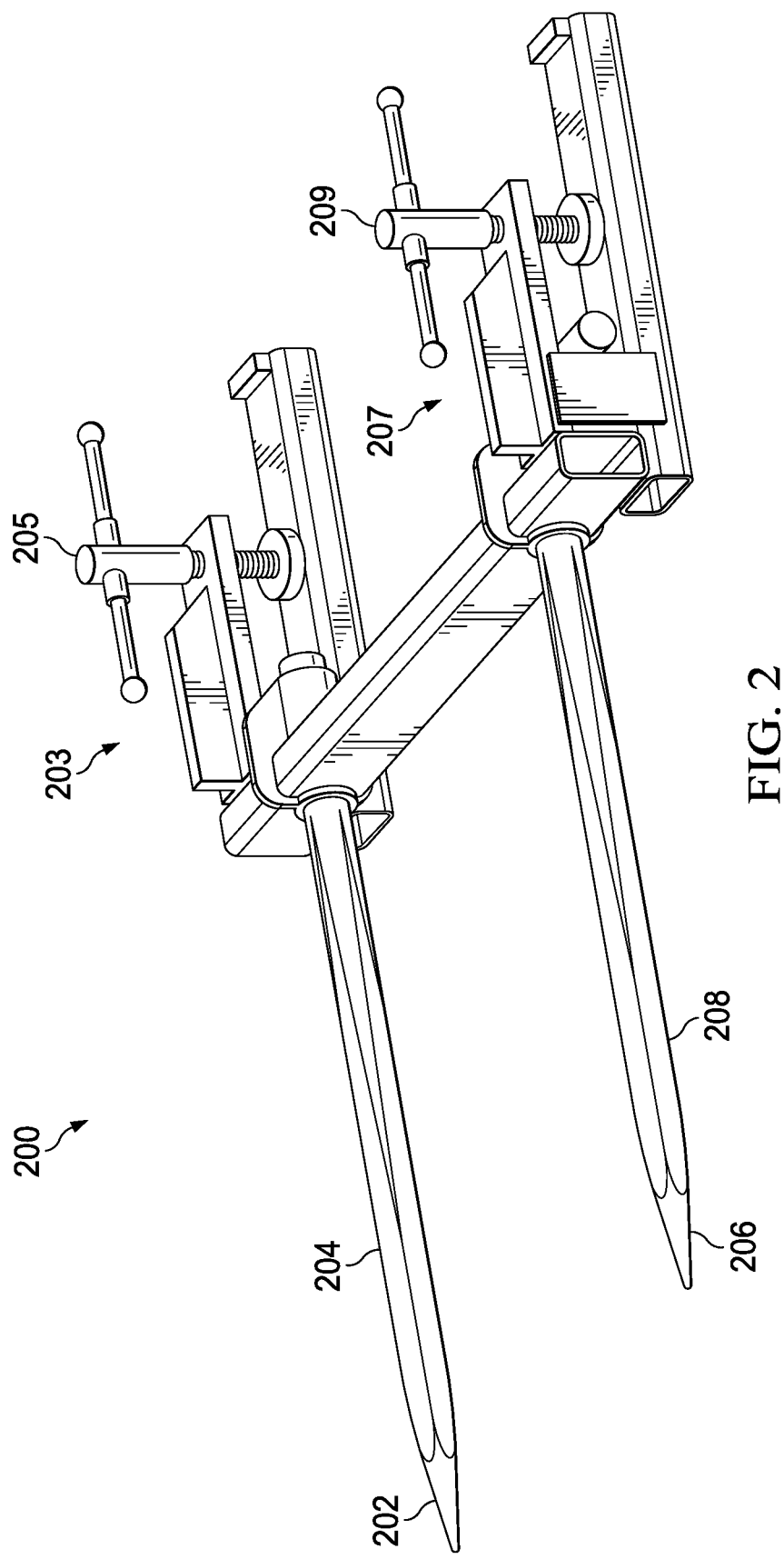
FIG. 2 is another embodiment of a hay bale spike.

FIG. 2 is another embodiment of a hay bale spike 200 that may be used, for example, with a front loader. The hay bale spike 200 includes, in this example, two spikes designated first front loader spike 202 and second front loader spike 206. Associated with the first front loader spike 202 is a first front loader pelican beam 204, and likewise associated with the second front loader spike 206 is a second front loader pelican beam 208. The first front loader pelican beam 204 and second front loader pelican beam 208 move with respect to the first front loader spike 202 and second front loader spike 206 similarly to a pelican's lower jaw or beak as it opens and closes. The first front loader pelican beam 204 is actuated by a first spike leverage mechanism 203 using a first beam leverage screw 205. The second front loader pelican beam 208 is actuated by a second spike leverage mechanism 207 using a second beam leverage screw 209. It will be understood that other mechanisms, such as 4-bar linkages or hydraulic actuators may be used to provide the motion and force required to hold the first front loader pelican beam 204 and second front loader spike 206 in their actuated or holding positions.

Figure 3:
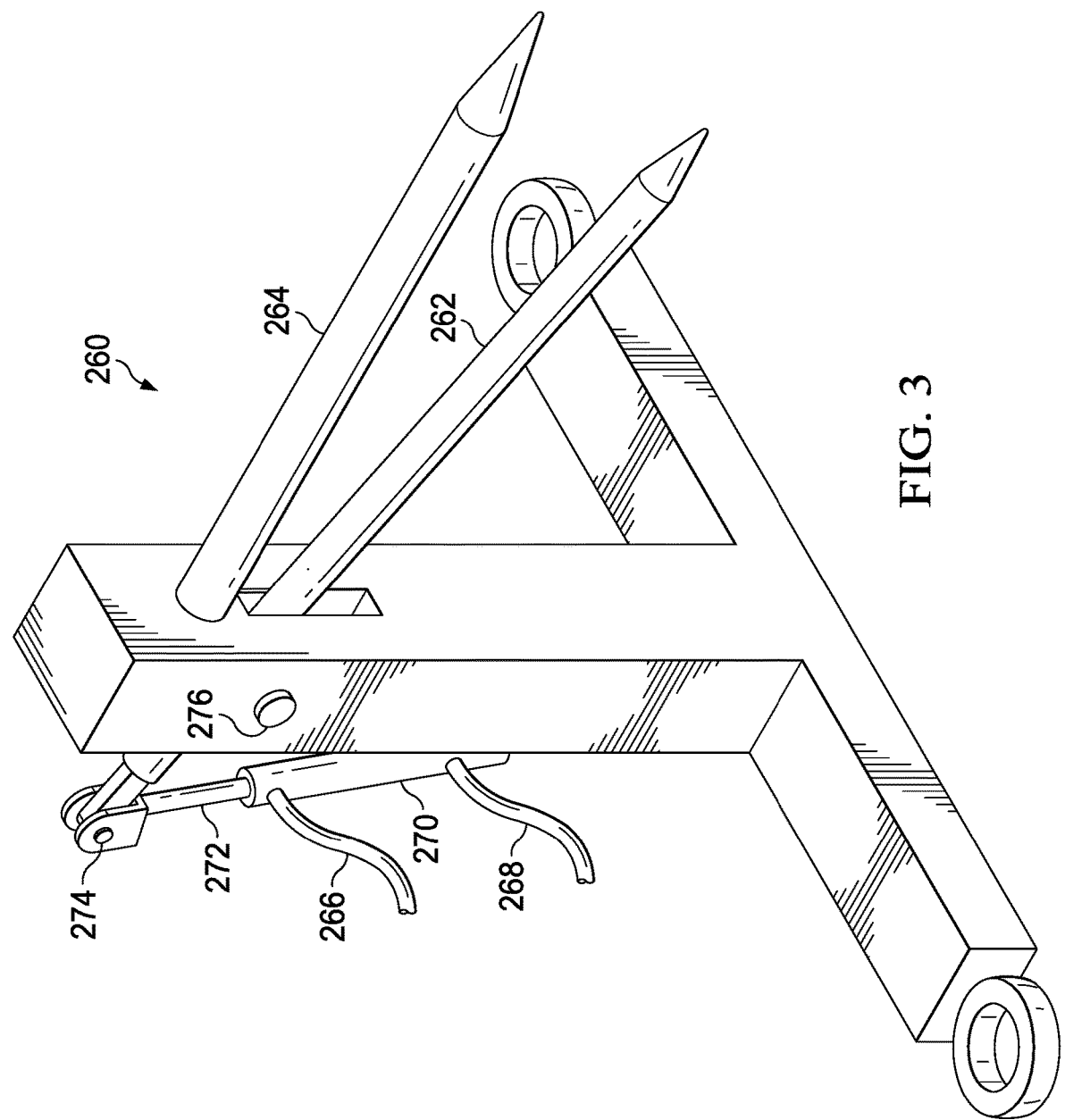
FIG. 3 is an alternate embodiment of a hay bale spike.

FIG. 3 is an alternate embodiment of a hay bale spike 260. In the hay bale spike 260 hydraulic lines 266, 268 provide pressurized fluid to a cylinder 270 that pushes and pulls a rod 272. The rod 272 works through a coupling 274 to provide force to a movable spike 262 relative to a fixed spike 264, using a lever 276.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. A hay bale carrying system comprising:
   a frame having a horizontal brace connected to a vertical brace, the horizontal brace having two mounting brackets positioned to attach the frame to a tractor;
   a main carrying arm rigidly connected to the vertical brace, the main carrying arm having a carrying arm central axis;
   a movable support arm movably attached to the vertical brace, the movable support arm having a movable support arm central axis; and
   wherein a range of motion between the movable support arm central axis and the carrying arm central axis is between about 30 degrees and about 45 degrees.

2. The hay bale carrying system of claim 1, wherein the movable support arm is rotatable about a pin, the pin positioned in the vertical brace pinning the vertical brace to the movable support arm.

3. The hay bale carrying system of claim 2, wherein the vertical brace includes a bottom hydraulic mount pivot pin and the moveable support arm includes a top hydraulic mount pivot pin; and the hay bale carrying system further comprises a hydraulic cylinder mounted to the bottom hydraulic mount pivot pin and the top hydraulic mount pivot pin.

4. The hay bale carrying system of claim 1, wherein the main carrying arm is between about 24 inches long and about 48 inches long and the movable support arm is between about 18 inches long and about 24 inches long.

5. The hay bale carrying system of claim 1, wherein the hay bale carrying system further comprises a third support arm rigidly attached to the frame, the third support arm having a length of between about 20 inches and 24 inches.

6. A hay bale carrying system comprising:
   a frame having a horizontal brace about 30 inches wide rigidly connected to a vertical brace about 30 inches tall, the horizontal brace having at least two mounting brackets positioned to attach the frame to a tractor, and the vertical brace having at least one mounting bracket positioned to attach the frame to a tractor;
   a main carrying arm rigidly attached to the vertical brace, the main carrying arm pointed away from the vertical brace, the main carrying arm having a length of between about 24 inches and about 48 inches; and
   a movable support arm pivotally attached to the vertical brace, the movable support arm pointed away from the vertical brace, the movable support arm having a length of about 18 inches to about 24 inches, wherein the movable support arm is movable relative to the main carrying arm.

7. The hay bale carrier of claim 6, wherein the movable support arm is rotatable about a pin, the pin positioned in the vertical brace, pinning the vertical brace to the movable support arm.

8. The hay bale carrier of claim 7, wherein the vertical brace includes a bottom hydraulic mount pivot pin and the moveable support arm includes a top hydraulic mount pivot pin; and the hay bale carrying system further comprises a hydraulic cylinder mounted to the bottom hydraulic mount pivot pin and the top hydraulic mount pivot pin.

9. A hay bale carrying system comprising:
   a frame having a horizontal brace rigidly connected to a vertical brace, the horizontal brace having two mounting brackets positioned to attach the frame to a tractor, and the vertical brace having a mounting bracket positioned to attach the frame to a tractor;
   a first support arm rigidly attached to the horizontal brace, the first support arm pointed away from the frame;
   a second support arm rigidly attached to the horizontal brace, the second support arm pointed away from the frame; and
   a main carrying arm rigidly connected to the vertical brace, the main carrying arm having a carrying arm central axis;
   a movable support arm pivotally attached to the vertical brace, the movable support arm having a movable support arm central axis; and
   wherein, when the movable support arm is in at least a first position, the main carrying arm central axis and the movable support arm central axis define a changeable axis angle.

10. The hay bale carrier of claim 9, wherein the movable support arm is rotatable about a pin, the pin positioned in the vertical brace pinning the vertical brace to the movable support arm.

* * * * *